United States Patent [19]

Chiba et al.

[11] Patent Number: 4,589,064
[45] Date of Patent: May 13, 1986

[54] SYSTEM FOR CONTROLLING KEY STORAGE UNIT WHICH CONTROLS ACCESS TO MAIN STORAGE

[75] Inventors: Takashi Chiba; Satoru Koga, both of Kawasaki; Minji Senda, Yokohama, all of Japan

[73] Assignee: Fujitsu Limited, Kawasaki, Japan

[21] Appl. No.: 469,817

[22] Filed: Feb. 25, 1983

[30] Foreign Application Priority Data

Feb. 27, 1982 [JP] Japan .................................. 57-31201
Feb. 27, 1982 [JP] Japan .................................. 57-31326

[51] Int. Cl.[4] ............................................. G06F 9/00
[52] U.S. Cl. .................................................. 364/200
[58] Field of Search ............................... 364/200, 900

[56] References Cited

U.S. PATENT DOCUMENTS

| | | | |
|---|---|---|---|
| 3,761,883 | 9/1973 | Alvarez et al. | 340/172.5 |
| 4,037,215 | 7/1977 | Birney et al. | 364/200 |
| 4,136,386 | 1/1979 | Annunziata et al. | 364/200 |
| 4,225,922 | 9/1980 | Porter | 364/200 |
| 4,293,910 | 10/1981 | Flusche et al. | 364/200 |
| 4,392,200 | 7/1983 | Arulpragasam | 364/200 |
| 4,399,506 | 8/1983 | Evans et al. | 364/200 |
| 4,439,830 | 3/1984 | Chueh | 364/200 |
| 4,441,152 | 4/1984 | Matsuura et al. | 364/200 |
| 4,471,163 | 9/1984 | Donald et al. | 364/200 |

FOREIGN PATENT DOCUMENTS 0019358 of 0000 European Pat. Off. .

OTHER PUBLICATIONS

Navy Technical Disclosure Bulletin, vol. 4, No. 8, Aug. 1979, pp. 43-48.
European Search Report, The Hague, Jun. 2, 1985, Examiner: P. Ledrut.

Primary Examiner—Gareth D. Shaw
Assistant Examiner—John G. Mills
Attorney, Agent, or Firm—Staas & Halsey

[57] ABSTRACT

A data processing apparatus includes at least one processing unit, a main storage unit, a main storage control unit, a key storage unit and a key storage control unit. The main storage unit is divided into blocks and the key storage unit stores main storage protection keys, each of which corresponds to one of the blocks of the main storage unit. Key storage access requests are received from a processing unit or the main storage control unit by the key storage control unit whenever data is to be read from or written to a block of main storage. The key storage control unit registers the key storage access requests in a key queue, prevents duplicate access requests from being registered, and processes the queued key storage access requests. The processing of key storage access requests includes updating the contents of the key storage unit to maintain a record of accesses to the main storage unit and controlling accesses to the main storage unit by permitting or denying access thereto.

8 Claims, 11 Drawing Figures

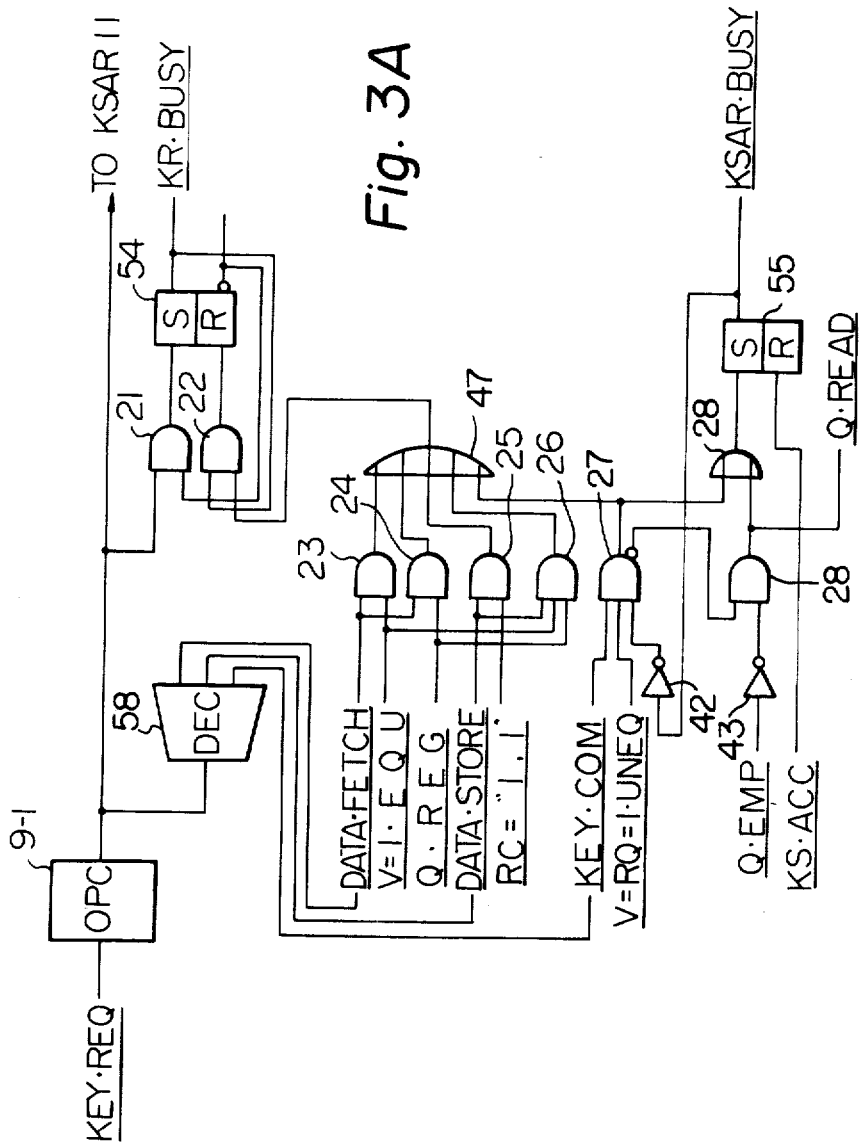

Fig. 5

| RESULT OF COMPARISON | RM,R,CM,C OF ENTRY | CONTROL OPERATION | V and RQ OF ENTRY OF KSAR11 | RM,R,CM,C OF ENTRY OF KSAR11 |
|---|---|---|---|---|
| V=1·RQ=1·EQU | 1111 | KREG9→KSAR11 | RESET TO V=0, RQ=0 | 1011 |
|  | 1100 | KREG9→KSAR11 | RESET TO V=0, RQ=0 | 1000 |
| V=1·EQU V=RQ=1·UNEQ | — | KREG9→KSAR11 | RESET TO V=0, RQ=0 | 1000 |
| V=1·UNEQ | — | KREG9→KSAR11 | — | 1000 |

SYSTEM FOR CONTROLLING KEY STORAGE UNIT WHICH CONTROLS ACCESS TO MAIN STORAGE

BACKGROUND OF THE INVENTION

1. Field of the Invention

The present invention relates to a system for controlling a key storage unit for storing main storage protection keys, reference bits, and change bits corresponding to blocks of a main storage unit.

2. Description of the Prior Art

In a digital processing system, a key storage unit may be used for protecting the computer programs or other contents in a main storage unit. In such a key storge unit, a main storage protection key, a reference bit, and a change bit corresponding to each block of the main storage unit are stored. When a central processing unit desires to access an address in a block of the main storage unit, the main storage protection key stored in the key storage unit is compared with a key presented by the central processing unit. If these two keys coincide, the central processing unit can access the address in the block. If these two keys do not coincide, however, the central processing unit cannot access the address in the block.

In the above-described key storage unit, when the data stored in a block of the main storage unit is read (fetched) by the central processing unit, the reference bit corresponding to that block of the main storage unit must be set to the logic value of "1". When the data originally stored in the block of the main storage unit is re-written (stored) by the central processing unit, both the reference bit and the change bit corresponding to the block of the main storge unit must be set to the logic value of "1". Generally, keys to the main storage unit are provided for every block of 2K bytes or 4K bytes, and every time data in the main storage unit is fetched or stored, the reference bit and the change bit in the key corresponding to the block containing the fetched or stored data must be renewed as described above.

Data access to the main storage unit is usually executed by interleave control. However, the use of interleave control for data access to the key storage unit makes the control process complicated, increases the amount of the hardware, and increases the cost. Thus, the key storage unit must be constructed of a memory device with a faster access time than the main storage unit. For example, if the main storage unit is constructed by a metal oxide semiconductor (MOS) random access memory (RAM) device, the key storage unit is constructed of a dynamic RAM device. However, the greater the capacity of the main storage unit, the more difficult the construction of the key storage unit and the higher the cost.

SUMMARY OF THE INVENTION

The object of the present invention is to provide a system for controlling a key storage for storing main storage protection keys in which an access request for the key storage unit having the same contents as a request already registered in a key queue is stopped from being registered in the key queue. Therefore, the access frequency to the key storage unit is decreased so that the key storage can be constructed of a memory device having the same access time as the main storage unit.

Another object of the present invention is to provide a system for controlling a key storage unit in which a reset reference command can be executed at high speed.

In accordance with the present invention, there is provided a system for controlling a key storage unit in a data processing apparatus. The data processing apparatus includes a main storge unit and a key storage unit for storing a main storage protection key, a reference bit, and a change bit corresponding to each block of the main storage unit. There is at least one processing unit which produces an access request for the main storage unit; a main storage control unit for processing the access request for the main storage unit; and a key storage control unit for controlling the access to the key storage unit.

The main storage control unit also produces an access request for the key storage unit to change the reference bit and the change bit in the key storage unit corresponding to the accessed block of the main storage unit. The access request for the key storage unit is supplied to the key storage control unit by the main storage control unit every time it accesses the main storage unit in response to the access request for the main storage unit supplied from the processing unit.

The key storage control unit includes a key queue for temporarily holding a plurality of access requests for the key storage unit supplied from the main storage control unit. The key storage control unit registers each of the access requests for the key storage unit supplied from the main storage control unit into the key queue in order. The key storage control unit, independent of the above-mentioned registering process, reads and processes each of the access requests for the key storage unit registered in the key queue in order.

The key storage control unit also includes means for comparing the content of the access request for the key storage unit supplied from the main storage control unit with the content of each access request for the key storage registered in the key queue. Also included in the key storage control unit is means for inhibiting the access request for the key storage unit supplied from the main storage control unit from being registered twice in the key queue. This is accomplished by checking the contents of the access request for the key storage unit supplied from the main storage control unit to see if it is equal to the contents of one of the access requests for the key storage unit already registered in the queue.

BRIEF DESCRIPTION OF THE DRAWINGS

FIGS. 3A, 3B, 3C, 3D, and 3E are detailed circuit diagrams of various portions of the control circuit in the key storage control unit of FIG. 2;

FIG. 5 is an operation diagram for the reset reference bit command.

DESCRIPTION OF THE PREFERRED EMBODIMENTS

A system for controlling a key storage unit according to the present invention will now be described in detail with reference to the accompanying drawings and preferred embodiments.

Figure 1:
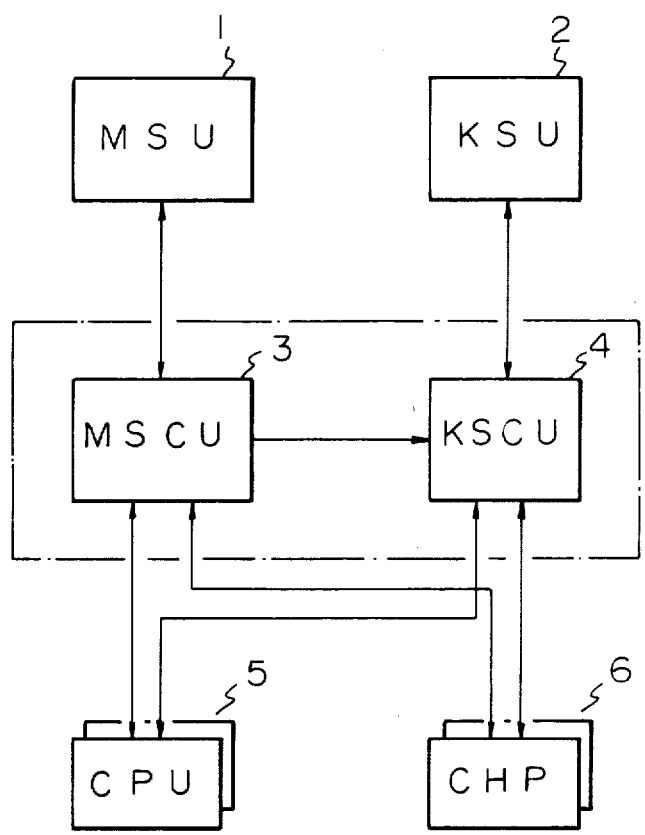
FIG. 1 is a block diagram of a data processing unit to which a system for controlling a key storage unit according to the present invention is applied.

A data processing apparatus to which a system for controlling a key storage unit according to the present invention is applied is illustrated in FIG. 1.

In FIG. 1, 1 indicates a main storge unit, 2 indicates a key storage unit, 3 indicates a main storage control unit, 4 indicates a key storage control unit, 5 indicates a group of central processing units (CPU), and 6 indicates a group of channel processing units (CHP). The key storage unit 2 stores a memory protection key, a reference bit, and a change bit corresponding to blocks of the main storage unit 1. The main storage control unit 3 controls the access to the main storage unit 1, and the key storage control unit 4 controls the access to the key storage unit 2. Every time the main storage control unit 3 accesses the main storage unit 1, the main storage control unit 3 outputs a key-storage access request to the key storage control unit 4. When a unit in the CPU group 5 or the CHP group 6 is going to access the key storage unit 2, it also outputs a key-storage access request to the key storage control unit 4. When one of the CPU group 5 or the CHP group 6 is going to access a block of the main storage unit for the first time, the CPU or CHP outputs an insert storage key (ISK) command to the key storage control unit 4, reads the contents of the entry of the key storage unit 2 corresponding to the block of the main storage unit 1, and checks whether the CPU or the CHP is qualified to access the present block.

Figure 2:
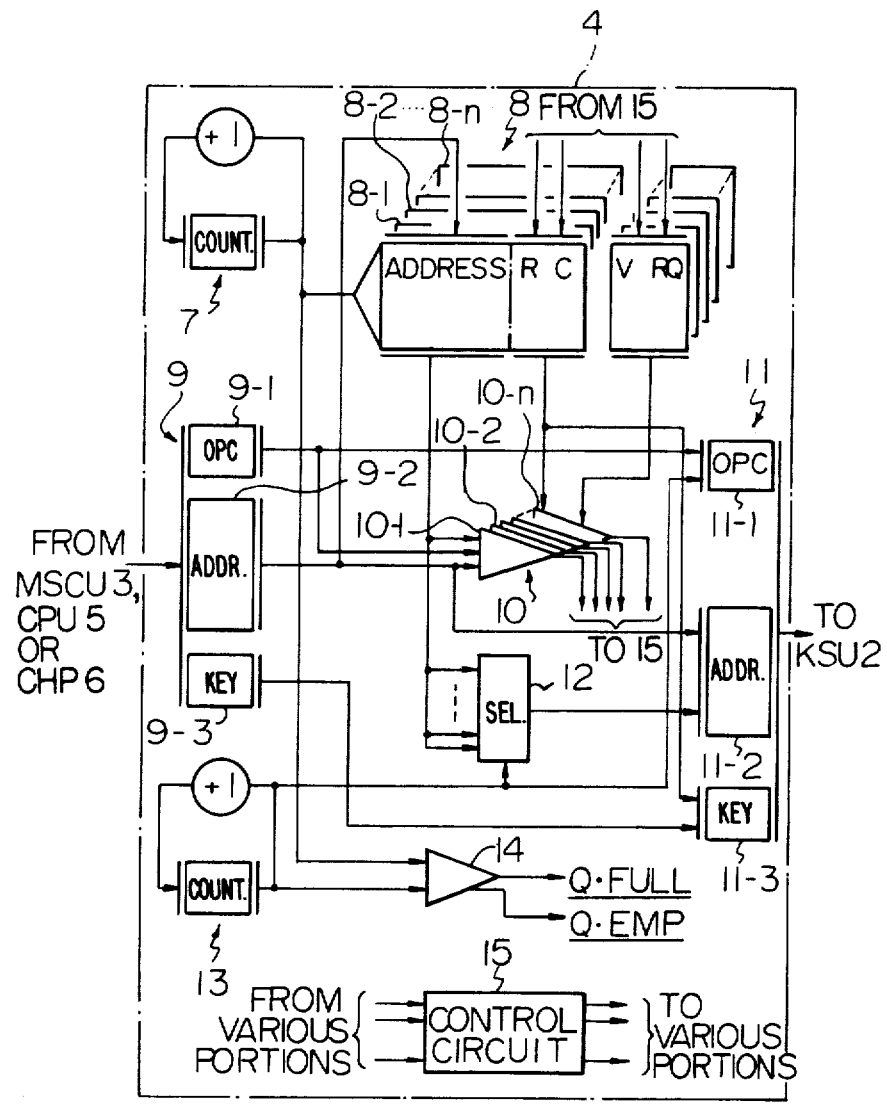
FIG. 2 is a block diagram of one embodiment of the key storage control unit of FIG. 1 according to the present invention.

The construction of the key storage control unit 4 is illustrated in FIG. 2. In FIG. 2, 7 indicates an in-queue counter, 8 indicates a key queue, 9 indicates a key register, 10 indicates a group of comparator circuits, 11 indicates a key storage access register, 12 indicates a selector circuit, 13 indicates an out-queue counter, 14 indicates a comparator circuit, and 15 indicates a control circuit.

The key queue 8 comprises n-stage unit memories 8-1 through 8-n. Each unit memory 8-1 through 8-n has a block address, a reference bit (R bit), a change bit (C bit), a validity bit (V bit), and a key-storage access request bit (RQ bit). The group of comparator circuits 10 comprises n comparator circuits 10-1 through 10-n corresponding to the unit memories 8-1 through 8-n of the key queue 8. The in-queue counter 7 is used for designating the unit memory of the key queue 8 into which data should be input. When the address, the R bit, and the C bit in the key register 9 are registered in the key queue 8, the in-queue counter 7 is incremented by +1 to designate the next available unit of the memory of the key queue.

The key register 9 is used for storing the key-storage access request supplied from a request source, for example, a unit in CPU group 5 or CHP group 6, or the main storage control unit 3. The key register 9 has an operation code (OPC) portion 9-1, an address portion 9-2, and a key data portion 9-3. The operation code (OPC) in the key-storage access request is one of the codes designating a data fetch command, a data store command, or key commands. The address in the key-storage access request designates a block address in the main storage unit 1. The key data is the data to be written in the key storage unit at the execution of a key command.

Like the key register 9, the key-storage access register 11 has an operation code (OPC) portion 11-1, an address portion 11-2, and a key data portion 11-3. The output terminals from each portion of the key register 9 are connected to the input terminals of each corresponding portion of the key-storage access register 11. The output terminals of the OPC portion 9-1 are also connected to the input terminals of the comparator circuit group 10. The output terminals of the address portion 9-2 are also connected to the address data input terminals of the comparator circuit group 10. The address bit read-out terminals of each unit memory 8-1 through 8-n of the key queue 8 are connected to the input terminals of each corresponding comparator circuit 10-1 through 10-n and to the corresponding input terminals of the selector circuit 12. The R bit and C bit read-out terminals of each unit memory 8-1 through 8-n of the key queue 8 are connected to the input terminals of each corresponding comparator circuit 10-1 through 10-n and to the corresponding input terminals of the key data portion 11-3 of the key-storage access register 11. The V bit and RQ bit read-out terminals of each unit memory 8-1 through 8-n of the key queue 8 are connected to the input terminals of each corresponding comparator circuit 10-1 through 10-n.

The output terminals of the comparator circuits 10-1 through 10-n are connected to the input terminals of the control circuit 15 which executes a control operation in accordance with the result of the comparison in the comparator circuits 10-1 through 10-n. The output terminals of the out-queue counter 13 are connected to the select input terminals of the selector circuit 12 and to the input terminal of the OPC portion 11-1 of the key-storage access register 11. The out-queue counter 13 is used for designating which one of the unit memories 8-1 through 8-n of the key queue 8 has its contents stored into the key-storage access register 11. Every time the contents of a unit memory in key queue 8 is put into the key-storage access register 11, the corresponding RQ bit in the key queue 8 is reset to the logic "0" and the out-queue counter 13 is incremented by +1. The output terminals of the selector circuit 12 are connected to the input terminals of the address portion 11-2 of the key-storage access register 11. The outputs of the key-storage access register 11 are supplied to the key storage unit 2.

The contents of the in-queue counter 7 and the out-queue counter 13 are supplied to the comparator circuit 14. The comparator circuit 14 compares the contents of these two counters 7 and 13. When these two contents become equal as the in-queue counter 7 is incremented, the comparator circuit 14 judges that the key queoue 8 is full, and produces a "full" signal (Q.FULL). When these two contents become equal as the out-queue counter 13 is incremented, the comparator circuit 14 judges that all the unit memories 8-1 through 8-n of the key queue 8 are empty and produces an "empty" signal (Q.EMP). These "full" and "empty" signals are supplied to the control circuit 15. The control circuit 15 is connected to each portion of the key storage control unit 4 and executes the necessary control operations.

The operations for controlling the key storage unit 2 executed by the key storage control unit 4 shown in FIG. 2 will now be described.

The operation code, address, and key data of the key-storage access request supplied from the main storage control unit 3 or a processing unit in CPU group 5 or CHP group 6 are stored in the key register 9. The key-storage access request is processed in according with the contents of the operation code, that is, a data fetch command, data store command, or key command.

In the case of a data fetch command, the data in the unit memories 8-1 through 8-n are read. Among these data, those with a V (validity) bit having a logic value of "1" are compared with the contents of the key register 9 in the comparator circuits 10-1 through 10-n.

If the address data in any one of the unit memories 8-1 through 8-n having a V bit with a logic value of "1" are equal to the contents of the address portion 9-2 of the key register 9, the key control operation is completed, making it possible for the key register 9 to receive the next key storage access request.

If none of the address data in the unit memories 8-1 through 8-n having a V bit with a logic value of "1" are equal to the contents of the address portion 9-2 of the key register 9 and if the key queue 8 is not full, the contents of the address portion 9-2 of the key register 9 is written into the unit memory of the key queue 8 designated by the in-queue counter 7, the R and C bits of this unit memory are set to "1, 0", and the V bit and the RQ bit of this unit memory are each set to "1". Then the in-queue counter 7 is incremented by +1, and it becomes possible for the key register 9 to receive the next key storage access request.

If none of the address data in the unit memories 8-1 through 8-n having a V bit with a logic value of "1" are equal to the contents of the address portion 9-2 and the key queue 8 is full, the process of writing the contents of the address portion 9-2 into a unit memory of the key queue 8 is stopped until a unit memory of the key queue 8 becomes empty. In this case, the key storage control unit 4 falls into the "busy" condition, and it is not possible for the key register 9 to receive the next key-storage access request.

In the case of the data store command, the data in the unit memories 8-1 through 8-n of the key queue 8 are read. Among these data, those having a V bit with a logic value of "1" are compared with the contents of the key register 9 by the comparator circuits 10-1 through 10-n.

If the address data in any one of the unit memories 8-1 through 8-n having a V bit with a logic value of "1" is equal to the contents of the address portion 9-2 and the R and C bits of this unit memory are "1, 0" and if the key queue 8 is not full, the V bit and the RQ bit of this unit memory are reset to "0", the contents of the address portion 9-2 is written into the unit memory of the key queue 8 designated by the in-queue counter 7, and the R and C bits of this unit memory are set to "1, 1". Then, the in-queue counter 7 is incremented by +1. After the above process, it becomes possible for the key register 9 to receive the next key-storage access request.

If the R and C bits of the unit memory with address data equal to the contents of the address portion 9-2 are "1, 0" and if the key queue 8 is full, the execution of the above-mentioned process stops until a unit memory of the key queue 8 becomes empty. In this case, the key storage control unit 4 falls into the "busy" condition, and it is not possible for the key register 9 to receive the next key storage access request. If the R and C bits of the unit memory with the address data equal to the content of the address portion 9-2 are "1, 1", the key control operation is completed, making it possible for the key register 9 to receive the next key storage access request.

If none of the address data of the unit memories 8-1 through 8-n are equal to the contents of the address portion 9-2 and if the key queue 8 is not full, the contents of the address portion 9-2 is written into the unit memory designated by the in-queue counter 7, the R and C bits of this unit memory are set to "1, 1", and the V and RQ bits of this unit memory are each set "1". Then, it becomes possible for the key register 9 to receive the next key-storage access request.

If none of the address data of the unit memories 8-1 through 8-n are equal to the contents of the address portion 9-2 and if the key queue 8 is full, the above-mentioned process stops until a unit memory of the key queue 8 becomes empty. In this case, the key storage control unit 4 falls into the "busy" condition, and it is impossible for the key register 9 to receive the next key-storage access request.

The key commands include a set storage key (SSK) command for storing in the key storage unit the contents of the first operand as the main storage protection key for the block designated by the second operand, an insert main storage protection key (ISK) command for inserting the main storage protection key of the block designated by the second operand into the first operand, a reset reference bit (RRB) command for resetting the reference bit in the main storage protection key of the block designated by the second operand, and so on.

When one of these key commands is received by the key register 9, the data in the unit memories 8-1 through 8-n of the key queue 8 are read, and compared with the contents of the address portion 9-2 of the key register 9. If the content of the address portion 9-2 is equal to one of these data and if the V bit and the RQ bit of the data both have a logic value of "1", the key queue is defined as being in a coincidence condition. The execution of the key command stops until the coincidence condition is released. In this condition, it is not possible for the key register 9 to receive the next key-storage access request. If the key queue 8 is not in the coincidence condition, the content of the key register 9 is put into the key-storage access register 11, and the operation for the key storage unit 2 is started. Then, it becomes possible for the key register 9 to receive the next key-storage access request.

Separate from the above-mentioned operations, when the key queue 8 is not empty and a key command is being executed, the data in the unit memory of the key queue 8 designated by the out-queue counter 13 are read, and the data is put into the key-storage access register 11. If the V bit and the RQ bit of the data both have the logic value of "1", the operation for controlling the change of the R and C bits in the key storage unit 2 is started. After the data in the key queue 8 is read and the data is put into the key-storage access register 11, the RQ bit of the corresponding unit memory in the key queue 8 is reset to the logic value of "0" and the out-queue counter 13 is incremented by +1.

The construction of the control circuit of the key-storage control unit 4 for carrying out the above-mentioned operations is illustrated in FIGS. 3A, 3B, 3C, 3D, and 3E. In these figures, 21 through 41 indicate AND gate circuits, 42 through 46 indicate NOT gate circuits, 47 through 53 indicate OR gate circuits, 54 through 57 indicate flip-flop circuits, and 58 through 60 indicate decoder circuits. The R bit (reference bit) in the unit memory 8-1 in the key queue 8 is denoted by $R_1$, its C bit (change bit) is denoted by $C_1$, its V bit (validity bit) is denoted by $V_1$, and its RQ bit (key-storage access request bit) is denoted by $RQ_1$. Generally, the R bit, C bit, V bit, and RQ bit of the unit memory 8-i of the key queue 8 are denoted respectively by $R_i$, $C_i$, $V_i$, and $RQ_i$.

THe unit memory 8-i will be denoted by the entry i hereafter.

FIG. 3A illustrates a portion of the control circuit 15 for producing "busy" signals (KR.BUSY and KSAR.-BUSY) for the key register 9 and the key-storage access register 11. When a key-storage access request (KEY.RED) is sent from the main storage control unit 3 or a unit of the CPU group 5 or the CHP group 6, it is supplied from the OPC portion 9-1 to the flip-flop circuit 54 through the AND gate circuit 21. The flip-flop 54 is set if it has been in the reset condition, and a key register busy signal (KR.BUSY) having a logic value of "1" is output. The operation code of the key-storage access request in the operation code portion 9-1 of the key register 9 is decoded by the decoder circuit 58 to decide whether the key-storage access request is a data fetch command, the data store command, or a key command. The key register busy signal (KR.BUSY) is reset by the output signal of the OR gate circuit 47 which is supplied to the flip-flop circuit 54 through the AND gate circuit 22. The reset condition for the key register busy signal occurs when any one of the following five conditions is fulfilled, as shown in FIG. 3A.

1. The key storage access request is a data fetch command (DATA.FETCH), and the content of the address portion 9-2 is equal to one entry in the key queue 8 which has a V bit with a logic value of "1" (the "equal" signal for an entry with $V = 1$ ($V = 1$.EQU) has a logic value of "1").
2. The key storage access request is a data fetch command (DATA.FETCH), and the queue register signal (Q.REG) (defined later) has a logic value of "1".
3. The key storage access request is a data store command (DATA.STORE), the "equal" signal for an entry with $V = 1$ ($V = 1$.EQU) has a logic value of "1", and the R and C bits of the entry with the same address data are "1, 1" (that is $RC = $ "1, 1").
4. The key-storage access request is a data store command (DATA.STORE), the "equal" signal for an entry with $V = 1$ ($V = 1$.EQU) has a logic value of "1", and the queue register signal (Q.REG) has a logic value of "1".
5. The key-storage access request is a key command (KEY.COM), the content of the addres portion 9-2 is not equal to the address data of any entry with $V = RQ = 1$ ($V = RQ = 1$.UNEQ), and the key storage access register busy signal (KSAR.BUSY) has a logic value of "0".

These five conditions are represented by the outputs of the AND gate circuits 23, 24, 25, 26, and 27, respectively. The outputs of these five AND gate circuits are supplied to the OR gate circuit 47.

The inverted output of the AND gate circuit 27 and the inverted signal of the queue empty signal (Q.EMP) are supplied to the AND gate circuit 28. The non-inverted output of the AND gate circuit 27 and the output of the AND gate circuit 28 are supplied to the OR gate circuit 48. The output of the AND gate circuit 28 is the queue read signal (Q.READ). The output of the OR gate circuit 48 is supplied to the set input of the flip-flop circuit 55. The key storage access signal (KS.ACC) is supplied to the reset input of the flip-flop circuit 55. The output of the flip-flop circuit 55 is the key storage access register busy signal (KSAR.BUSY).

Figure 3B:
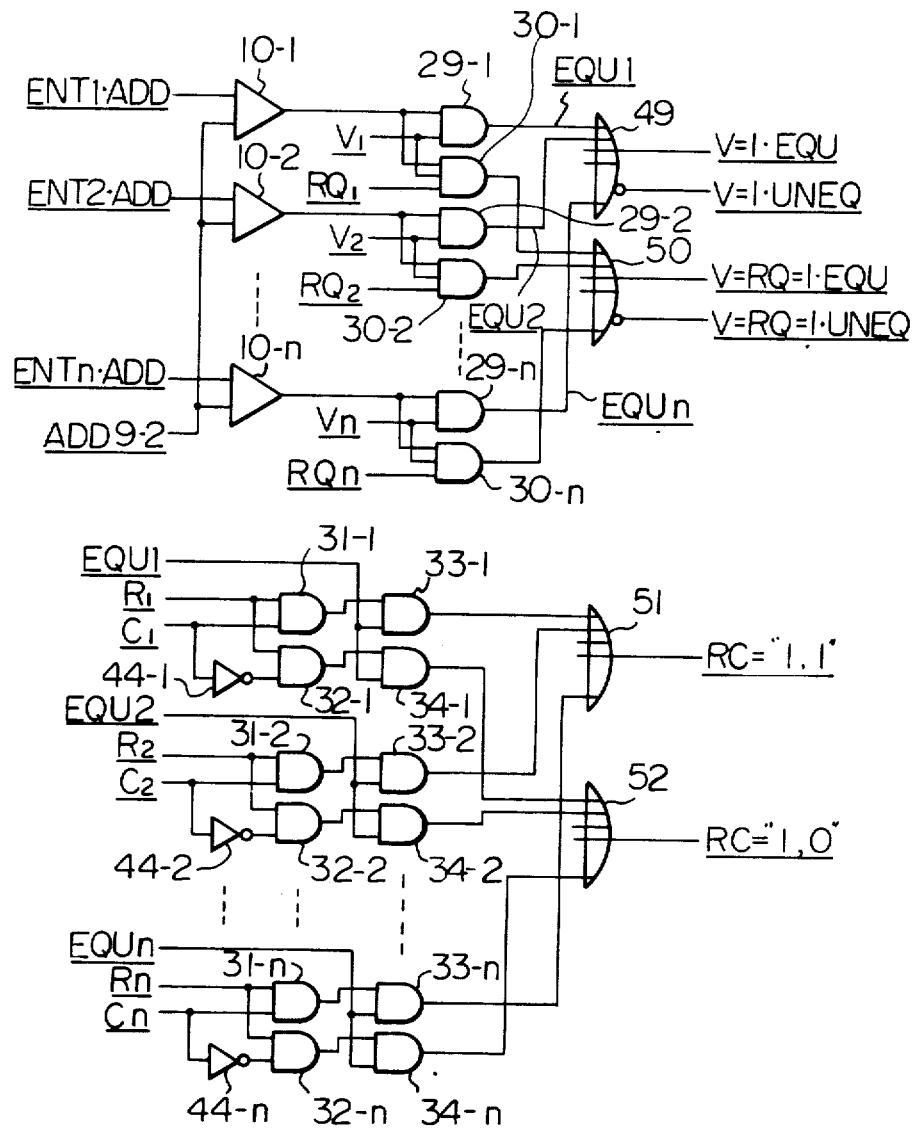

The construction of a portion of the control circuit 15 for judging whether or not the content of the key register 9 is equal to the entry data of the key queue 8 is illustrated in FIG. 3B. The address data in the entries 1 through n of the key queue 8 are compared with the contents of the address portion 9-2 of the key register 9 in the comparator circuits 10-1 through 10-n. The output of the comparator circuits 10-i and the V bit of the entry i of the key queue 8 are supplied to the AND gate circuit 29-i. The output of the comparator circuit 10-i and the V and RQ bits of the entry i of the key queue 8 are supplied to the AND gate circuit 30-i. The outputs (EQU1 through EQUn) of the AND gate circuits 29-1 through 29-n are supplied to the OR gate circuit 49. The non-inverted output of the OR gate circuit 49 has a logic value of "1" when the contents of the address portion 9-2 are equal to the address data of one entry having a V bit with a logic value of "1", and this output is denoted by the "equal" signal for an entry with $V = 1$ ($V = 1$.EQU). The inverted signal of the OR gate circuit 49 is denoted by the "unequal" signal for an entry with $V = 1$ ($V = 1$.UNEQ). The non-inverted output of the OR gate circuit 50 has a logic value of "1" when the contents of the address portion 9-2 are equal to the address data of one entry having a V bit with a logic value of "1" and having a RQ bit with a logic value of "1", and this output is denoted by the "equal" signal for an entry with $V = RQ = 1$ ($V = RQ = 1$.EQU). The inverted output of the OR gate circuit 50 is denoted by the "unequal" signal for an entry with $V = RQ = 1$ ($V = RQ = 1$.UNEQ).

The R bit and C bit of entry i are supplied to the AND gate circuit 31-i, and the R bit and the inverted signal of the C bit of entry i are supplied to the AND gate circuit 32-i. The output of the AND gate circuit 29-1 (that is, the "equal" signal i) and the output of the AND gate circuit 31-i are supplied to the AND gate circuit 33-i. The "equal" signal i (EQUi) and the output of the AND gate circuit 32-i is supplied to the AND gate circuit 34-i. The outputs of the AND gate circuits 33-1 through 33-n are supplied to the OR gate circuit 51. The output of the OR gate circuit 51 has a logic value of "1" when the R and C bits are "1,1" in the entry which has the same address as the address portion 9-2, and it is denoted by $RC = $ "1,1". The outputs of the AND gate circuits 34-1 through 34-n are supplied to the OR gate circuit 52. The output of the OR gate circuit 52 has a logic value of "1" when the R and C bits are "1,0" in the entry which has the same address as the address portion 9-2, and it is denoted by $RC = 1,0$".

Figure 3C:
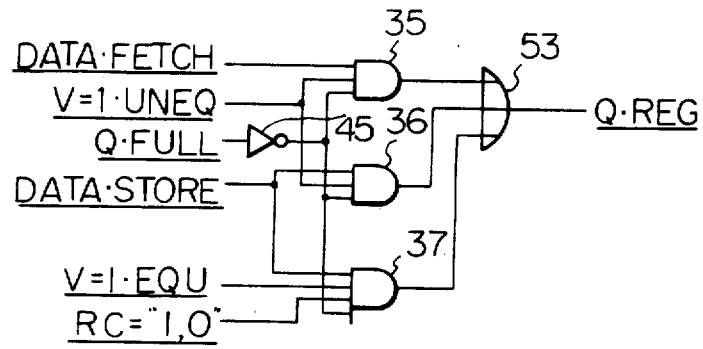

FIG. 3C illustrates the construction of a circuit in the control circuit 15 for producing the queue register signal. The output of the AND gate circuit 35 has a logic value of "1" when the following three conditions are fulfilled: the key storage access request is a data fetch command, the "unequal" signal for an entry with $V = 1$ ($V = 1$. UNEQ) has a logic value of "1", and the queue full signal (Q.FULL) has a logic "0". The output of the AND gate circuit 36 has a logic value of "1" when the following three conditions are fulfilled: the key storage access request is a data store command, that the "unequal" signal for an entry with $V = 1$ ($V = 1$.UNEQ) has a logic value of "1", and the queue full signal (Q.FULL) has a logic value of "0". The output of the AND gate circuit 37 has a logic value of "1" when the following four conditions are fulfilled: the key storage access request is a data store command, the "equal" signal for an entry with $V = 1$ ($V = 1$.EQU) has a logic value of "1". the $RC = $ "1,0" signal has a logic value of "1", and that the queue full signal (Q.FULL) is logic "0". The outputs of the AND gate circuits 35, 36, and 37 are supplied to the OR gate circuit 53. The output of the OR gate circuit 52 is the queue register signal (Q.REG).

Figure 3D:
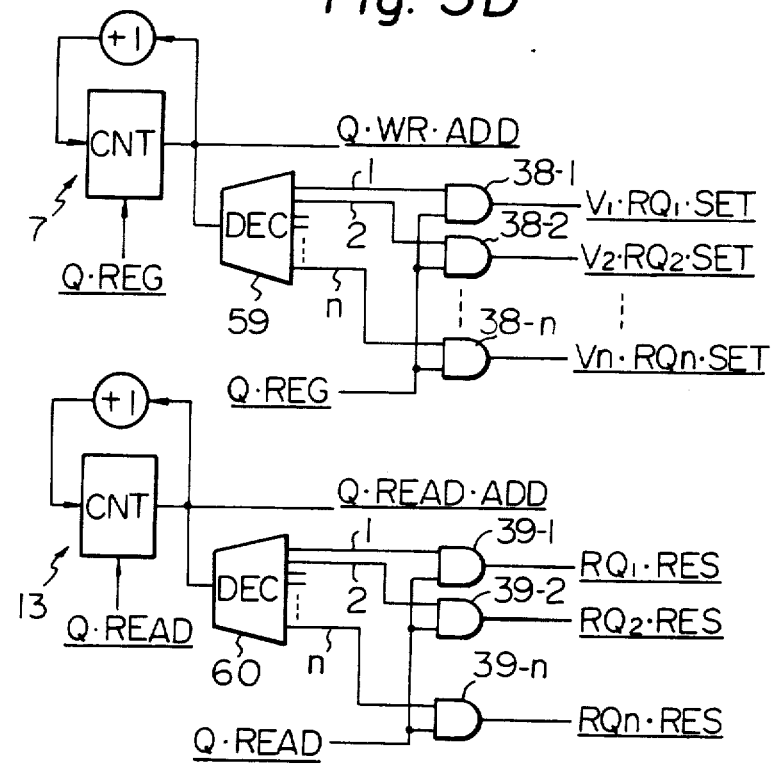

FIG. 3D illustrates the construction of circuits in the control circuit 15 for producing the set signals for the V and RQ bits and the reset signals for the RQ bits of the entries 1 through n. The contents of the in-queue counter 7 is the key queue writing address and is supplied to the decoder circuit 59. The output of the decoder circuit 59 corresponding to entry i and the queue register signal are supplied to the AND gate circuit 38-i. The output of the AND gate circuit 38-i is the set signal for Vi and RQi (VI.RQi.SET). When the contents of the in-queue counter 7 designates entry i, the i-th output of the decoder circuit 59 has a logic value of "1". When the queue register signal (Q.REG) becomes logic "1" in this case, the set signal for Vi and RQi (Vi.RQi.SET) becomes logic "1", the Vi and RQi bits in entry i are set to logic "1", and the contents of the in-queue counter 7 is incremented by $+1$ and becomes $i+1$. The contents of the out-queue counter 13 is the key queue reading address and is supplied to the decoder circuit 60. The ith output of the decoder circuit 60 and the queue read signal (Q.READ) are supplied to the AND gate circuit 39-i. The output of the AND gate circuit 39-i is the reset signal for the RQi bit of the entry i (RQi.RES). When the content of the out-queue counter 13 is i, the ith output of the decoder circuit 60 has a logic value of "1". When the queue read signal (Q.READ) has a logic value of "1" in this case, the reset signal for RQi bit has a logic value of "1", the RQ bit of entry i is reset to logic "0", and the contents of the out-queue counter 13 is incremented by $+1$ and becomes $i+1$.

Figure 3E:
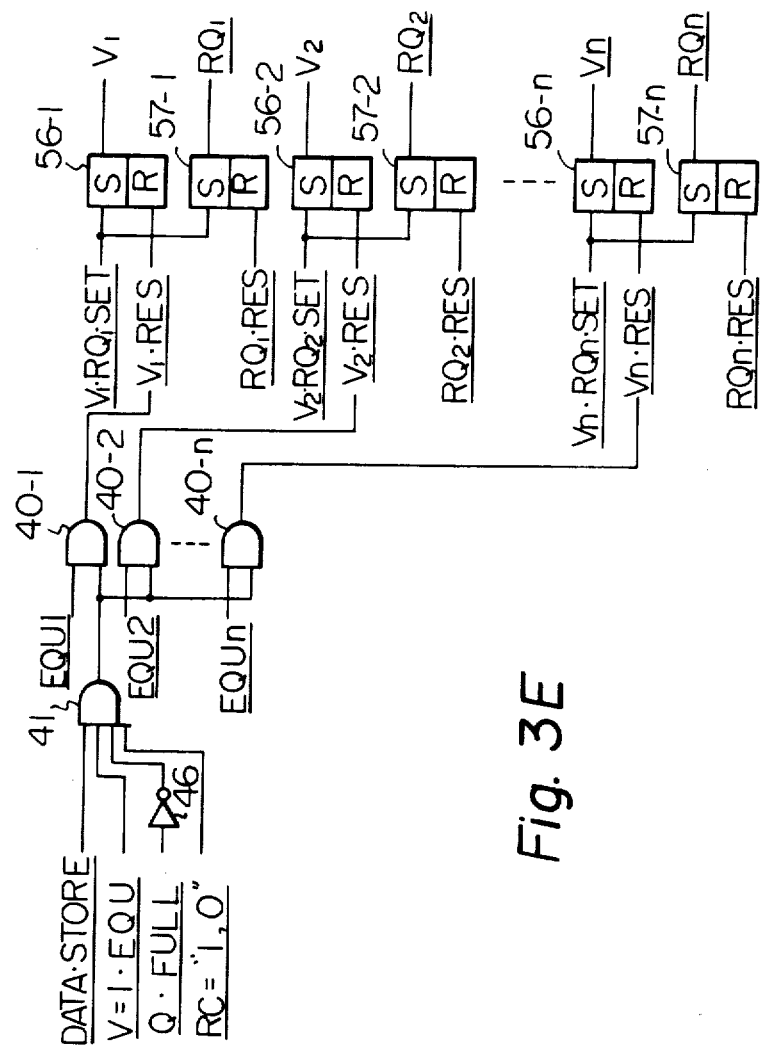

FIG. 3E illustrates the construction of the circuit for producing the reset signals of the V bits of the entries 1 through n. The output of the AND gate circuit 41 has a logic value of "1" when the following four conditions are fulfilled: the key storage access request is the data store command, the "equal" signal for an entry with $V=1$ ($V=1.EQU$) has a logic value of "1", the $RC=1,0$" signal has a logic value of "1", and the queue full signal (Q.FULL) has a logic value of "0". The output of the AND gate circuit 41 and the output of the AND gate circuit 29-i ("equal" signal i) are supplied to the AND gate circuit 40-i. The output of the AND gate circuit 40-i is the reset signal for the Vi bit (Vi.RES). The flip-flop circuits 56-1 through 56-n are used for storing the V bits of the entries 1 through n. The set signal for the Vi and RQi bits (Vi.RQi.SET) is supplied to the flip-flop circuit 56-i, and the reset signal for the Vi (Vi.RES) bit is supplied to the reset input of the flip-flop circuit 56-i. The flip-flop circuits 57-1 through 57-n are used for storing the RQ bits of the entries 1 through n. The set signal for the Vi and RQi bits (Vi.RQi.SET) is supplied to the set input of the flip-flop circuit 57-i, and the reset signal for the RQi bit (RQi.RES) is supplied to the reset input of the flip-flop circuit 57-i.

In the above-mentioned embodiment, the key-storage access request from the main storage control unit 3 or the like is put into the key register 9 and compared with the contents of the key queue 8. If a key-storage access request with the same content as the newly received one has already been registered into the key queue, registering of the received key storage access request is not executed. If a key storage access request with the same content is not registered in the key queue 8 and if the key storage access request is produced by the main storage fetch or store command, the key-storage access request is registered into the key queue 8. The registered key-storage access requests are read in order, put into the key storage access register 11, and sent to the key storage unit 2.

Figure 4A:
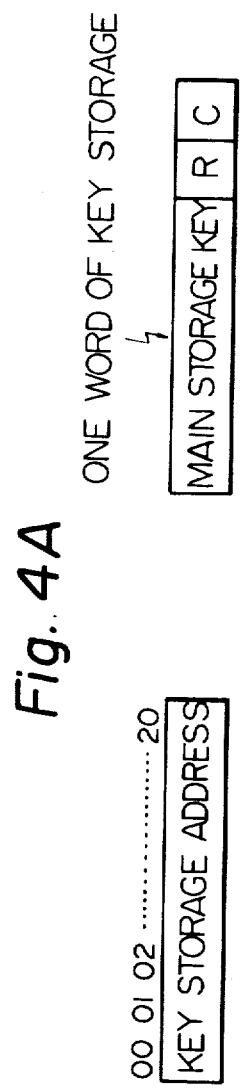
FIGS. 4A, 4B, and 4C are formats of the contents of the main storage unit, the key storage unit, and the key queue.
Figure 4B:
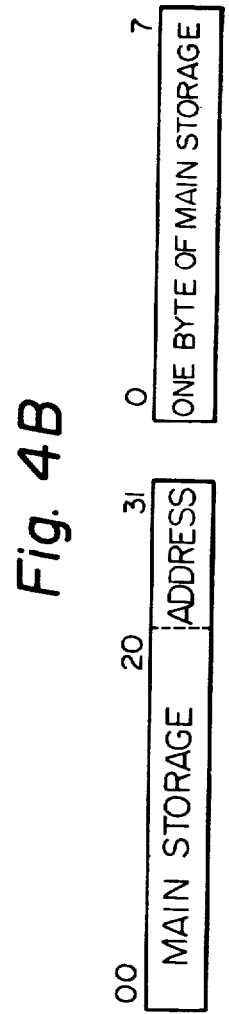
Figure 4C:
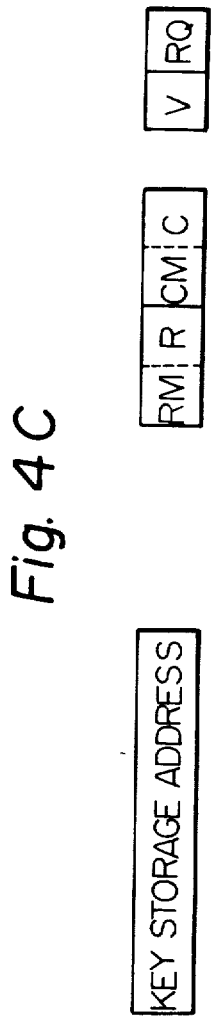

FIG. 4A illustrates one word of the key storage unit 2 and the key storage address. FIG. 4B illustrates one byte (word) of the main storage unit 1 and the main storage address. One word of the key storage unit 2 includes a main storage key, a reference bit, and a change bit. The key storage address corresponds to one block of the main storage unit 1. In the above-mentioned embodiment, the R bit and the C bit in the key storage unit 2 are respectively changed to logic "1" and "0" in the case of a data fetch and are changed to logic "1" and "1" in the case of a data store. However, the C bit is preferably kept unchanged in the case of a data fetch. In order to change only one of the R and C bits, mask bits for R and C bits (RM and CM bits) may be used. FIG. 4C illustrates the data format of one entry of the key queue 8 with RM and CM bits.

In the above-mentioned embodiment, when a key command is received by the key register 9, the key address of the key command is compared with the address of the key-storage access requests registered in the key queue 8. If the key storage access request has the same address as the key command, the execution of the key command stops until this key-storage access request is executed. Among the key commands, however, the reset reference bit command (RRB command) is usually repeatedly executed to reset all the R bits in the key storage unit 4. Thus, it is desirable to execute the RFB command without waiting for the registered key-storage access request with the same address to be executed, from the viewpoint of speeding up the processing.

In another embodiment of the present invention, there is provided a system for controlling the main storage key in which the RFB command is executed without waiting until the execution of the key-storage access request with the same address registered in the key queue 8. In this system, the construction of the key storage control unit 4 is the same as shown in FIG. 2, except that each entry of the key queue 8 has the mask bits RM and CM. The processing for the data fetch and the data store in this system is the same as described above.

When the insert storage key command (ISK command) is put into the key register 9, the contents of the address portion 9-2 is compared with the address data of the entries 1 through n. If the contents of the address portion 9-2 is equal to the address data of one entry having $V-R=1$, the execution of the ISK command stops until the execution of the access request registered in the corresponding entry is finished. If the contrents of the address portion 9-2 is not equal to the address data of any entry having $V=RQ=1$, the content of the key register 9 is put into the key-storage access register 11, and the ISK command is executed.

When the set storage key command (SSK command) is put into the key register 9, the content of the address portion 9-2 is compared with the address data of the entries 1 through n of the key queue 8. If the content of the address portion 9-2 is equal to the address data of one entry with $V=RQ=1$, the execution of the SSK command stops until the execution of the access request registered in the corresponding entry. If the content of the address portion 9-2 equal to the address data of one entry with $V-1$ and $RQ=0$, the V bit and the RQ bits of the corresponding entry are reset to logic "0", the content of the key register 9 is set into the key-storage access register 11, and the SSK command is executed. If the content of the address portion 9-2 is not equal to the address data of any entry with V=1, the content of the key register 9 is set into the key-storage access register 11, and the SSK command is executed.

When the RRB command is put into the key register 9, the content of the address portion 9-2 is compared with the address data of the entries 1 through n. If the content of the address portion 9-2 is equal to the address data of one entry with V=RQ=1 and the RM, R, CM, and C bits of this entry are "1111", then the V and RQ bits of this entry are reset to "0", the content of the key register 9 is set into the key-storage access register 11, and the RM, R, CM, and C bits in the key-storage access register 11 are set to "1011". Then, the RRB command is executed, and the R and C bit of the corresponding address in the key storage unit 2 are set to "01". If the content of the address portion 9-2 is equal to the address data of one entry with V=RQ=1 and the RM, R, CM, and C bits of this entry are "1100", then the V and RQ bit of this entry are changed to "0", the contents of the key register 9 is put into the key-storage access register 11, and the RM, R, CM, and C bits of this entry are set to "1000". Then, the RRB command is executed, and the R bit of the corresponding address in the key storage unit 2 is reset to "0". In this case, the C bit of the corresponding address in the key storage unit 2 is not changed.

If the contents of the address portion 9-2 is equal to the address data of an entry with V=1 and RQ=0, then the V and RQ bits of this entry are reset to "0, 0", the content of the key register 9 is put into the key-storage access register 11, and the RM, R, CM, and C bits of the key register 11 are set to "1000". Then, the RRB command is executed as described above. If the contents of the address portion 9-2 is not equal to the address data of any entry with V=1, the contents of the key register 9 is set into the key-storage access register 11, the RM, R, CM, and C bits of the key storage access register 11 are set to "1000", then the RRB command is executed.

The above-mentioned operation of the RRB command is illustrated in FIG. 5.

As described above, in accordance with this embodiment of the present invention, the processing of the RRB command can be speeded up.

We claim:

1. A system for controlling a key storage unit in a data processing apparatus, comprising:
    a main storage unit having at least one block;
    a key storage unit for storing a main storage protection key, at least one reference bit, and at least one change bit for each block of said main storage unit;
    a processing unit, said processing unit producing at least one access request for said main storage unit;
    a main storage control unit, operatively connected to said main storage unit and said processing unit, for processing the access request for said main storage unit and producing a key storage access request for said key storage unit, said key storage access request having address data and requesting a change in the reference bit and the change bit in said key storage unit, the reference bit and the change bit corresponding to the accessed block of said main storage, said main storage control unit supplying said key storage access request for said key storage unit every time said main storage control unit accesses said main storage unit in response to the access request for said main storage unit supplied from said processing unit;
    a key storage control unit, operatively connected to said processing unit and said main storage control unit, for controlling access to said key storage unit, comprising:
    a key queue, operatively connected to said main storage control unit and said key storage unit, for temporarily holding a plurality of said key storage access requests supplied from said main storage control unit, said key storage control unit registering each of said key storage access requests supplied from said main storage control unit into said key queue in order, and said key storage control unit, independent of the above-mentioned registering process, reading and processing each of said key storage access requests registered in said key queue in order;
    comparing means, operatively connected to said key queue and said main storage control unit, for comparing the content of said key storage access request supplied from said main storage control unit with the content of each key storage access request registered in said key queue; and
    inhibiting means, operatively connected to said comparing means and said key queue, for inhibiting said key storage access request supplied from said main storage control unit from being registered in said key queue when the content of said key storage access request supplied from said main storage control unit is equal to the content of one of said key storage access requests registered in said key queue.

2. A system for controlling a key storage unit as defined in claim 1, wherein said key queue has n unit memories, each of said unit memories storing address data, a reference bit, and a change bit.

3. A system for controlling a key storage unit as defined in claim 2,
    wherein said processing unit is capable of producing key commands as said key storage access request for said key storage unit,
    wherein the at least one access request for said main storage includes a fetch access request and a store access request, and
    wherein said key storage control unit further comprises decoding means, operatively connected to said main storage control unit, said processing unit and said inhibiting means, for decoding said key storage access request supplied from said main storage control unit or said processing unit, and for determining whether said key storage access request from one of said main storage control unit and said processing unit is a main storage data fetch command applied from said main storage control unit to said key storage control unit in accordance with the fetch access request for said main storage unit from said processing unit, a main storage data store command applied from said main storage control unit to said key storage control unit in accordance with the storage access request for said main storage unit from said processing unit, or one of the key commands for said key storage unit from said processing unit.

4. A system for controlling a key storage unit as defined in claim 3, wherein the key commands comprise:
    an insert storage key command for reading the main storage protection key in said key storage unit;

a set storage key command for placing the main storage protection key in said key storage unit; and pl
a reset reference bit command for resetting said reference bit in said key storage unit.

5. A system for controlling a key storage unit as defined in claim 4,
   wherein said reset reference bit command has an address portion, and
   wherein when the reset reference bit command is supplied to said key storage control unit, the address portion of the reset reference bit command is compared with the address data of said key storage access requests registered in said key queue, and if the address portion of the reset reference bit command is equal to the address data of one of said registered key storage access requests, the reference bit at the corresponding address of said key storage unit is reset and at the same time, the change bit at the same address of said key storage unit is changed as requested in said registered kdy storage access request.

6. A key storage control system for controlling a key storage unit, operatively connected to a processing unit, and a main storage control unit, a key storage access request being supplied to said key storage control system by one of the processing unit and the main storage control unit, said key storage control system comprising:
   queuing means, operatively connected to the processing unit, the main storage control unit and the key storage unit, for adding the key storage access request to in-queue access requests; and
   control means, operatively connected to said queuing means, for comparing the in-queue access requests with the key storage access request, for preventing queuing of the key storage access request when the key storage access request matches one of the in-queue access requests, and for processing the in-queue access requests.

7. A key storage control system as set forth in clam 6, wherein said queuing means comprises:
   a key register, operatively connected to the central processing unit, the channel processing unit, the main storage control unit and said control means, having an operation code portion, an address portion and a key data portion;
   a key queue comprising n unit memories, each of said unit memories comprising:
      an address portion operatively connected to the address portion of said key register;
      a reference bit portion operatively connected to said control means;
      a change bit portion operatively connected to said control means;
      a validity bit portion operatively connected to said control means; and
      a key storage access request bit portion operatively connected to said control means;
   first comparing means, operatively connected to said key register, said key queue and said control means, for comparing the address portion of said key register with the address portion in each of said unit memories of said key queue, said comparing means comprising n comparing circuits;
   an in-queue counter, operatively connected to said key queue, for counting the key storage access requests as they enter said key queue;
   a selector, operatively connected to said key queue and said control means, for selecting one of the key storage access requests to be executed;
   an out-queue counter, operatively connected to said selector, for counting key storage access requests as they are executed;
   second comparing means, operatively connected to said in-queue counter, said out-queue counter and said control means, for providing a queue-full signal and a queue-empty signal; and
   a key-storage access reqister, operatively connected to said key register, said key queue, said out-queue counter and said selector, for supplying the key storage access request to the key storage unit.

8. A key storage control system as set forth in claim 7, within said control means comprises:
   a decoder, operatively connected to the operation code portion of said key register, for decoding the contents of the operation code portion of said key register;
   key register busy means, operatively connected to said key register and said decoder, for generating a key register busy signal;
   key-storage access register busy means, operatively connected to said key register, said decoder and said key register busy means, for generating a key-storage access register busy signal;
   entry locating means, operatively connected to said key queue and said first comparing means, for generating signals indicating whether a matching entry, having an address portion which matches the address portion of said key register, exists in said key queue and signals indicating whether the matching entry has a request bit equal to a first value;
   reference bit means, operatively connected to said key queue and said entry locating means, for generating a signal indicating that the matching entry has a reference bit equal to the first value and a change bit equal to the first value and for generating a signal indicating that the matching entry has a reference bit equal to the first value and a change bit equal to a second value;
   queue register signal means, operatively connected to said second comparing means, said decoder, said key-storage access register busy means, said entry locating means and said reference bit means, for generating a queue register signal which has a logic value equal to the first value if said entry locating means indicates that the matching entry is not in said key queue, said second comparing means indicates that said key queue is not full and said decoder indicates that the contents of the operation code portion in said key register is a data fetch command or a data store command, or said entry locating means indicates that the matching entry is in said key queue, said second comparing means indicates that said key queue is not full, said decoder indicates that the contents of the operation code portion of said key register is a data store command and said reference bit means indicates that the reference bit equals the first value and the change bit equals the second value for the matching entry;
   set signal means, operatively connected to said in-queue counter, said key queue and said queue register signal means, for generating signals which set validity and request bits in said key queue;

request bit reset means, operatively connected to said key queue, said out-queue counter and said key-storage access register busy means, for generating signals which reset the request bits in said queue; and validity bit reset means, operatively connected to said key queue, said second comparing means, said decoder, said entry locating means, said reference bit means and said set signal means, for generating signals which reset the validity bits in said key queue.

* * * * *

UNITED STATES PATENT AND TRADEMARK OFFICE
CERTIFICATE OF CORRECTION

PATENT NO. : 4,589,064

DATED : May 13, 1986

INVENTOR(S) : CHIBA ET AL.

It is certified that error appears in the above-identified patent and that said Letters Patent is hereby corrected as shown below:

```
Column 1, line 16, "storge" should be --storage--;
Column 4, line 7, after "terminals" insert --of the
key queue 8 and to the input terminals--;
         line 30, "terminal" should be
--terminals--;
         line 37, after "logic" insert
--value of--;
         line 49, "queoue" should be --queue--.
Column 6, line 3, after "set" insert --to--;
         line 43, after "is" (second occurrence)
insert --not--;
Column 7, line 1, "THe" should be --The--;
         line 7, "RED)" should be --REQ)--;
         line 17, "the" should be --a--;
         line 44, "addres" should be --address--;
Column 8, line 55, after "logic" insert
--value of--;
         line 66, ""1"." should be --"1",--;
         line 67, delete "that"; and "is logic
"0"." should be --has a logic value of "0".--.
Column 9, line 2, "52" should be --53--;
         line 12, "(VI" should be --(Vi--.
```

UNITED STATES PATENT AND TRADEMARK OFFICE
CERTIFICATE OF CORRECTION

PATENT NO. : 4,589,064

DATED : May 13, 1986

INVENTOR(S) : CHIBA ET AL.

Page 2 of 2

It is certified that error appears in the above-identified patent and that said Letters Patent is hereby corrected as shown below:

```
Column 10, line 23, "requests" should be
--request--;
          line 30, "RFB" should be --RRB--;
          line 36, "RFB" should be --RRB--;
          line 50, "V-R=1," should be --V=RQ=1,--;
          line 52, "contrents" should be
--contents--;
          line 66, "V-1" should be --V=1--.
Column 13, line 2, delete "pl";
          line 20, "kdy" should be --key--;
          line 41, "clam" should be --claim--.
```

Signed and Sealed this

Second Day of September 1986

[SEAL]

Attest:

DONALD J. QUIGG

Attesting Officer

Commissioner of Patents and Trademarks